(12) United States Patent
Pham

(10) Patent No.: US 11,770,347 B1
(45) Date of Patent: Sep. 26, 2023

(54) METHOD OF RISK-SENSITIVE RATE CORRECTION FOR DYNAMIC HETEROGENEOUS NETWORKS

(71) Applicant: Govt of the US as rep by the Secy of the Air Force, Wright Patterson AFB, OH (US)

(72) Inventor: Khanh Dai Pham, Albuquerque, NM (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 64 days.

(21) Appl. No.: 17/653,361

(22) Filed: Mar. 3, 2022

Related U.S. Application Data

(63) Continuation of application No. 63/158,188, filed on Mar. 8, 2021, and a continuation of application No. 63/158,213, filed on Mar. 8, 2021.

(51) Int. Cl.
*H04L 47/76* (2022.01)
*H04L 47/129* (2022.01)
*H04L 47/70* (2022.01)

(52) U.S. Cl.
CPC ............ *H04L 47/76* (2013.01); *H04L 47/129* (2022.05); *H04L 47/827* (2013.01)

(58) Field of Classification Search
CPC ..... H04L 2012/5681; H04L 2012/5679; H04L 47/2441; H04L 2012/5651; H04L 47/10; H04L 47/6215; H04L 2012/5682; H04L 47/50; H04L 49/3081; H04L 49/90; H04L 47/11; H04L 2012/5632; H04L 47/32; H04L 47/56; H04L 43/16; H04L 47/522; H04L 2012/5648; H04L 47/263; H04L 49/15; H04L 49/255; H04L 12/5601; H04L 2012/5649; H04L 47/6255; H04L 47/70; H04L 47/805; H04L 49/25; H04L 49/3018; H04L 49/508; H04L 49/9005;
(Continued)

(56) References Cited

U.S. PATENT DOCUMENTS

| 7,949,318 B2 | 4/2011 | Prasad |
| 8,140,070 B2 | 3/2012 | Ashikhmin et al. |

(Continued)

OTHER PUBLICATIONS

X. Tian, G. Chen, K. D. Pham, and E. Blasch, "Joint Transmission Power Control in Transponded SATCOM Systems," IEEE Military Communications Conference, DOI: 10.1109/MILCOM.2016. 7795313, Baltimore, MD, 2016.
(Continued)

*Primary Examiner* — Djenane M Bayard
(74) *Attorney, Agent, or Firm* — AFMCLO/JAZ; Larry L. Huston

(57) ABSTRACT

A dynamic heterogeneous network for transmitting media. The network has plural sources sending signals through various links and routers to plural destinations. Upon identifying a bottleneck link the network matches actual demand rate to actual service rate. A buffer setpoint is established to accommodate the difference between the demand rate and the service rate. The network determines an epoch having a penalty for deviation from the buffer setpoint. The rate allowance is reallocated to reduce the media bottleneck.

17 Claims, 7 Drawing Sheets

(58) Field of Classification Search
CPC . H04L 49/9036; H04L 47/125; H04L 49/205; H04L 45/00; H04L 45/60; H04L 45/745; H04L 45/7452; H04L 45/74591; H04L 47/20; H04L 49/3009; H04L 49/3036; H04L 49/3072; H04L 63/0227; H04L 69/22; H04L 63/1458; H04L 47/193; H04L 47/283; H04L 43/0852; H04L 43/0864; H04L 25/03872; H04L 41/12; H04L 41/122; H04L 65/61; H04L 2012/5605; H04L 2012/561; H04L 2012/568; H04L 49/201; H04L 49/254; H04L 49/30; H04L 49/50; H04L 65/764; H04L 9/40; H04L 12/1881; H04L 41/0826; H04L 41/145; H04L 41/5003; H04L 65/1101; H04L 65/70; H04L 65/762; H04L 65/80; H04W 72/23; H04W 72/046; H04W 72/1268; H04W 72/21; H04W 72/54; H04W 72/1221; H04W 28/14; H04W 28/18; H04W 28/24; H04W 72/12; H04W 72/1263; H04W 84/06; H04W 24/00; H04W 36/0044; H04W 36/0055; H04W 36/08; H04W 36/30; H04W 24/08; H04W 12/10; H04W 56/005; H04W 74/0833; H04W 74/085; H04W 72/04; H04W 28/065; H04W 40/12; H04W 72/52; H04W 28/02; H04W 28/0268; H04W 28/10; G06F 3/0601; G06F 3/0673; G06F 3/0656; G06F 12/0866; G06F 9/3001; G06F 9/30181; G06F 9/3552; G06F 13/14; G06F 13/40; G06F 3/061; G06F 3/0659; G06F 3/0689; G06F 3/121; G06F 3/1236; G06F 3/1285; G06F 3/1295

See application file for complete search history.

(56) References Cited

U.S. PATENT DOCUMENTS

| | | | |
|---|---|---|---|
| 9,743,362 B1 | 8/2017 | Tian | |
| 9,991,587 B1 | 6/2018 | Freedman | |
| 2007/0189164 A1* | 8/2007 | Smith | H04L 43/087 |
| | | | 370/230 |
| 2008/0165875 A1 | 7/2008 | Mundarath | |
| 2009/0080334 A1* | 3/2009 | DeCusatis | H04L 47/10 |
| | | | 370/237 |
| 2010/0091678 A1 | 4/2010 | Chen | |
| 2010/0303002 A1 | 12/2010 | Zorba Barah | |
| 2011/0205889 A1* | 8/2011 | Chen | H04L 47/2416 |
| | | | 370/230 |
| 2011/0205895 A1* | 8/2011 | Chen | H04L 47/10 |
| | | | 370/231 |
| 2014/0059377 A1* | 2/2014 | Zhang | G06F 3/00 |
| | | | 714/E11.054 |
| 2017/0288769 A1 | 10/2017 | Miller | |
| 2018/0132110 A1* | 5/2018 | Furuichi | H04L 47/70 |
| 2018/0152230 A1 | 5/2018 | Khojastepour | |
| 2018/0152231 A1 | 5/2018 | Jeong | |
| 2022/0039095 A1* | 2/2022 | Pham | H04B 7/18517 |

OTHER PUBLICATIONS

Pham KD. "Power allocation for shared transponders: A statistical optimal control paradigm." In2018 IEEE Aerospace Conference Mar. 3, 2018 (pp. 1-10). IEEE.

K. D. Pham, "Assured Satellite Communications: A Minimal-Cost-Variance System Controller Paradigm," American Control Conference, pp. 6555-6561, DOI: 10.1109/ACC.2016.7526702, Boston, MA, 2016.

K. D. Pham, "Minimal-Variance-Cost Power Control for Differentiated Services Satellite Communications," IEEE Aerospace Conference, pp. 1-8, DOI:10.1109/AERO.2016.7500831, Big Sky, MT, 2016.

K. D. Pham, "Minimal Variance Control of Clock Signals," IEEE Aerospace Conference, pp. 1-8, DOI:10.1109/AERO.2016.7500498, Big Sky, MT, 2016.

L. Cosenza, M. K. Sain, R. W. Diersing, and C. H. Won, "Cumulant control systems: the cost-variance, discrete-time case," Advances in Statistical Control, Algebraic System Theory, and Dynamic System Characteristics, C.- H. Won et al. (eds), Birkhauser Boston, DOI: 10.1007/978-0-8176-4795-7, 2008.

G. Giorgi and C. Narduzzi, "Performance Analysis of Kalman-Filter-Based Clock Synchronization in IEEE 1588 Networks," in IEEE Transactions on Instrumentation and Measurement, vol. 60, No. 8, pp. 2902-2909, Aug. 2011, doi: 10.1109/TIM.2011.2113120.

K. D. Pham, "Control Engineering for Hybrid Ground and Space Precoding in Multi-Gateway Multi-Beam Satellite," 2021 IEEE Aerospace Conference (50100), 2021, pp. 1-9, doi: 10.1109/AERO50100.2021.9438378.

K. D. Pham, "Risk-Sensitive Rate Correcting for Dynamic Heterogeneous Networks: Autonomy and Resilience," 2020 IEEE Aerospace Conference, 2020, pp. 1-10, doi: 10.1109/AERO47225.2020.9172717.

K. D. Pham, "A Control-Theoretic Approach to Precoding for Multi-Cast Multi-Beam over Satellite," 2020 IEEE Aerospace Conference, 2020, pp. 1-11, doi: 10.1109/AERO47225.2020.9172594.

* cited by examiner ial Application No. 63/158,188, filed Mar. 8, 2021, the disclosure of which is incorporated herein by reference and claims priority to and the benefit U.S. Provisional Application No. 63/158,213, filed Mar. 8, 2021, the disclosure of which is incorporated herein by reference.

STATEMENT OF GOVERNMENT INTEREST

The invention described herein may be manufactured and used by or for the Government of the United States for any government purpose without the payment of any royalty.

FIELD OF THE INVENTION

The present invention relates to heterogeneous networks having at least one bottleneck and more particularly to dynamic heterogeneous networks having rate allocating routers and/or switches for bottleneck mitigation.

BACKGROUND OF THE INVENTION

Networked systems, such as a smart grid, the internet of things, internet-above-the-cloud, and smart cities, are used to handle the increasing flows of services distributed throughout communication networks. More particularly, autonomous networked systems have long been used for routing communications from a plurality of sources to a plurality of destinations. But during routing, bottlenecks can occur at various links between the sources and destinations.

The underlying principle of autonomous networks is that the network can autonomously enable the subset of S users or sources, $_S$, as indexed by $s \in S$ to generate communication loads on a corresponding subset of possible routes $_R$, which are indexed by $r_{s \in R}$ and $s \in S$. These communication loads conscientiously demand a threshold of bandwidth or bandwidth per unit time over a subset of routes $_R$. The communication loads rely on a subset of network resources or unidirectional links $_L$, with each link $l \in L$ having a finite capacity, $c_l$. Consequently, in the relevant zero-one routing matrix, A is constituted of $A_{ls}=1$ when link 1–L is in the route $r_s \in R$ of the user, otherwise the source $s \in S$, and $A_{ls}=0$.

The problem for the network is to compensate for normal fluctuations in the allocated aggregate source rates at the bottleneck link without exceeding the inherent capacity of the system. Thus, it is desirable to have a method of compensating for both rate-based flow control and explicit congestion indication feedback techniques, while considering the change in source rate $x_s(t)$ in one time interval will be modest and $\tilde{x}_s(t-1)$ will be close to $\tilde{x}_s(t)$ and $s \in S$.

Prior art attempts have used a unified formulation with the state-space realization as a structure for high dynamics bottleneck links l involving various forms of aggregate state variables, aggregate observed outputs, and feedback control inputs. But such attempts rely upon rate allocating output queues to respond to changing conditions only after the fact. An approach which considers demand rate, service rate and a stochastic control paradigm is needed. Such an approach which preferably uses a state-space realization for the high dynamics of bottleneck link l incorporating various forms of aggregate state variables, aggregate observed outputs and feedback control inputs is needed.

Furthermore, there is a need to provide for adaptive rate correction with explicit congestion indication feedback for a multi-link topology and for distributed window flow control responses to accommodate a plurality of competing flows and sources. In order to address system heterogeneity and the unpredictable dynamics of networked systems, such an algorithm may set analytical performance bounds. Targeting a unified formulation, the state-space realization for high dynamics of bottleneck link l involves various forms of aggregate state variables, aggregate observed outputs, and feedback control inputs

SUMMARY OF THE INVENTION

In one embodiment the invention comprises dynamic heterogeneous network for transmitting media over satellite networks and terrestrial networks, the system comprises: at least one satellite for receiving and transmitting a media signal; at least one terrestrial media service provider for receiving and transmitting a media signal; a link intermediate the at least one satellite and at least one media service provider, whereby a media signal transmitted from the media service provider is transmitted through the link to said satellite, and a non-transitory computer readable medium operably associated with the link and configured to autonomously allocate a respective buffer size to each of the media signals according to a closed loop allocation algorithm having predetermined rate allocation performance specifications. In another embodiment the invention comprises a method therefor.

DETAILED DESCRIPTION OF THE INVENTION

The notations $(\ )^T$, $(\ )^*$, $(\ )^H$ and $E[.i]$ stand for the transpose, conjugate, conjugate transpose and expected value operators, respectively. The end of the epoch is herein referred to as time t. The term bottleneck 13 refers to the data limiting node between a source 15 and a destination 16 in a multi-node network 10.

Figure 1:
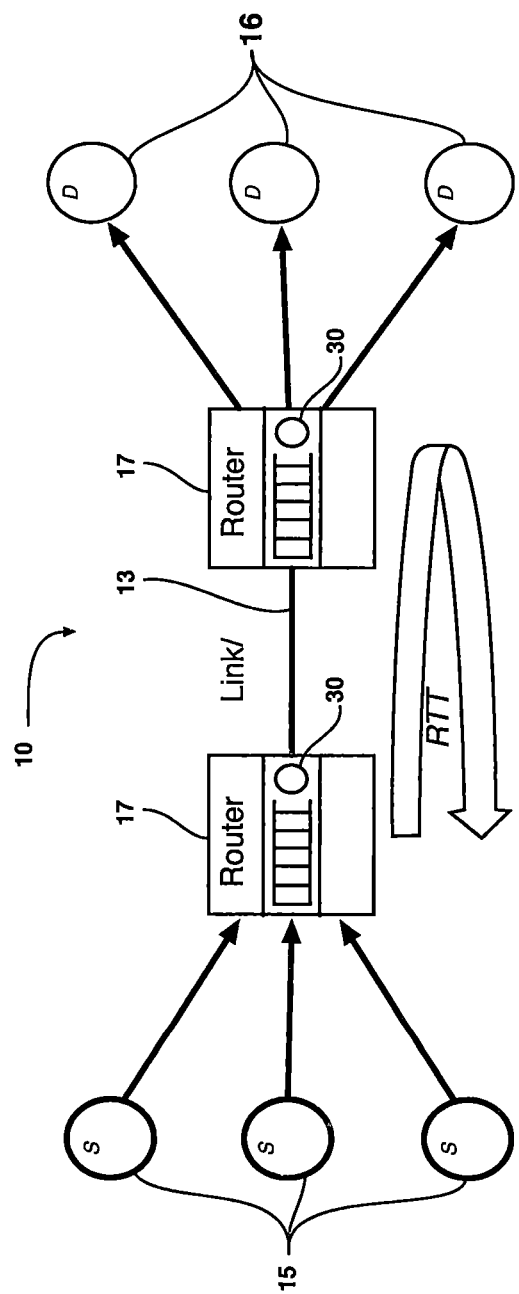
FIG. 1 is a block diagram of an exemplary multisource heterogeneous network according to the present invention having a bottleneck at link 1 and an adaptive window allocation.

Referring to FIG. 1, the system of the present invention comprises a heterogeneous network 10. A heterogeneous network 10 uses plural network 10 architectures and plural operating systems. Heterogeneous networks 10 are more complex to operate than a homogeneous system having only a single architecture and single operating system, But a network 10 originally planned and installed as homogeneous may become heterogeneous over time, as augmented capacity and new functions become necessary or additional components do not match the original installation. Difficulties in allocating bandwidth to bottlenecks 13 in heterogeneous systems are common. The difficulties arise due to competing priorities with different equipment and unmatched interfaces between unlike components.

The system of the present invention has a plurality of rate allocating routers 17 to channel communications between a first plurality of sources 15 and a second plurality of destinations 16. The first plurality and second plurality may be equal or unequal in number, with the plurality of destinations 16 typically being greater than the plurality of sources 15.

During the period of communication between sources 15 and destinations 16, time is divided into epochs, t, comprising a multiplicity of round trip times (RTT) where each RTT is related to the sum of propagation and queueing delays. In a degenerate case, the epoch time is taken as RTT. The goal is to maximize spectral efficiency, which is the rate at which information can be transmitted over a given bandwidth in bits per second per hertz.

Routers 17 may become a bottleneck 13 intermediate the sources 15 and the destinations 16. The routers 17 can be classified into different levels. A Level 1 router 17 is a router 17 disposed in a predetermined area which does not connect to another area. Level 1 routers 17 function as stub routers 17 and only communicate with other Level 1 routers 17. A Level 2 router 17 is a backbone router 17 which does not connect to other areas. Level 2 routers 17 track information and only communicate other Level 2 routers 17. A Level 1-2 router 17 is a normal router 17 or a backbone router 17 which connects to other areas. Level 1-2 routers 17 communicate with both Level 1 routers 17 and Level 2 routers 17, thereby connecting different areas of the network 10. The boundaries of the areas can be at the routers 17 or can be between the routers 17.

Streams of communications in such a network 10 are modeled as a regular flow of packets from a source 15 to one or more destinations 16 over a series of routes connected by links and one of which has a bottleneck 13 link with its rate allocating router 17 or switch. Sources 15 (also known as users of networked systems) are considered to always have data to send. A service rate is taken as the inverse of the time between consecutive packets serviced throughout the same communication.

The networks 10 described and claimed herein are adaptive networks 10. By adaptive, it is meant that the networks 10 engage in dynamic autonomous routing whereby a router 17 can forward data via a different path than the path currently under load. The router 17 can change paths based upon dynamic conditions and change back as warranted. Changes may occur due to congestion and overloading or even due to complete loss of a connection between nodes.

Routing decisions are based upon instantaneous network 10 traffic and overall network 10 topology. The routing decisions use protocols to determine optimal pathways between sources 15 and destinations 16. Dynamic routing provides compensation for choking and/or loss of service by transferring the signals among plural routes to continue service during changing conditions.

Protocols suitable for use with the present invention include an Intermediate System to Intermediate System Protocol (IS-ISP), which is generally used for large networks 10, a Routing Information Protocol (RIP) which is generally used for short distance transport and link-state routing protocols, such as an Open Shortest Path First Protocol (OSPFP), which divide the system into areas which include networks 10, hosts and routers 17. The IS-ISP is a link-state routing protocol, where the routers 17 exchange topology information with neighboring routers 17. This exchange provides all routers 17 with the information of the complete topology. The next address to which data are forwarded is determined by choosing the best end-to-end path to the final destination 16. The complete data knowledge provides routes which satisfy predetermined criteria and meet quality of service requirements. The RIP is a distance-vector dynamic routing protocol which uses hop count as a routing metric to find the best path. The path with the lowest hop count is placed in the routing table. Routing loops are prevented by limiting the allowable number of hops. The OSPFP relies upon routers 17 to exchange traffic data with adjacent routers 17. These data are then used throughout the network 10 to calculate end-to-end paths using the Dijkstra algorithm or a variation thereof. This particular algorithm calculates routes considering the entire network 10 by choosing the best end-to-end path to the final destination 16 at that specific epoch. However, as more routers 17 are eventually added to the network 10, the size and number of nodes in the network 10 increases. Thus, the OSPFP generally does not scale well.

Figure 2:
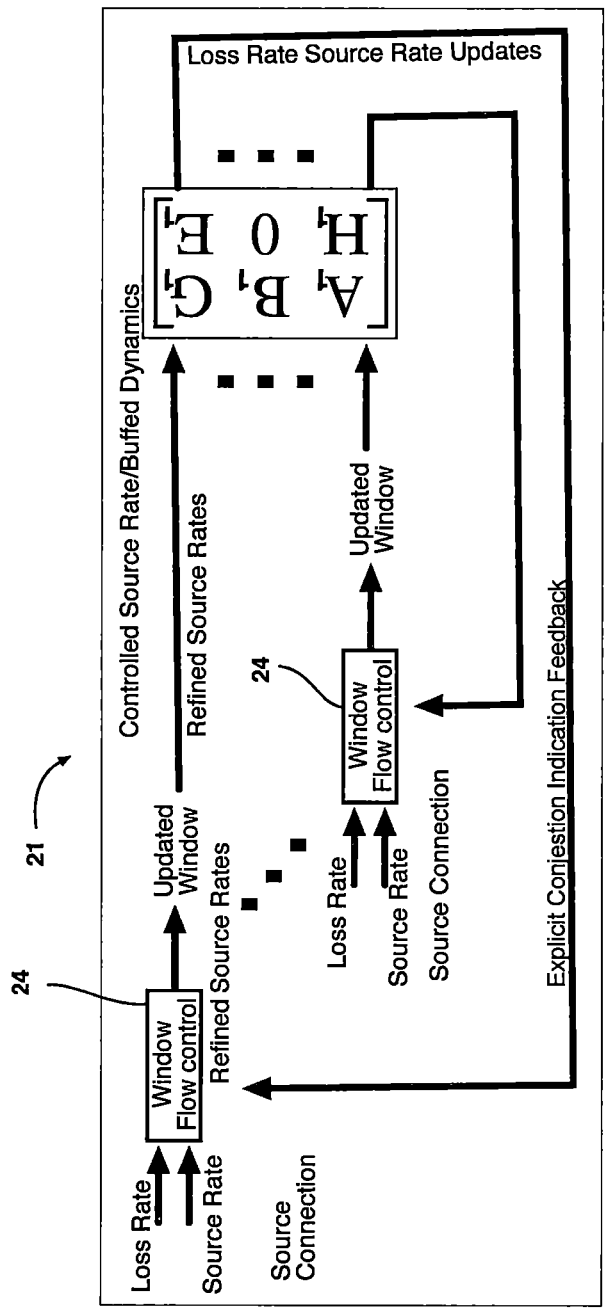
FIG. 2 is a block diagram of an exemplary multisource network according to the present invention having nested feedback loops.

Referring to FIG. 2, according to the invention bottleneck 13 links with rate allocating routers 17 or switches may be any of the aggregate input rate of all the users, the aggregate service rate subject to time lags or the buffer 18 size stabilization as accounted for by a tractable state-space realization. Time scales may be disaggregated for use with both rate and window-based flow control mechanisms to extract high frequency bottleneck 13 rates from low frequency bottleneck 13 rates. The network 10 of the present invention uses a discrete-time linear stochastic system to allocate rate capacity among routers 17 at a bottleneck 13 link l.

Various sources 15 transmit data at various rates, depending upon amount of information to be conveyed during each epoch. The change in source 15 rate is relatively small over a single time interval and for a particular time interval is given by:

$$\tilde{x}_s(t+1) = \tilde{x}_s(t) + b_s u_s(t); \ s \in S \qquad \text{Eq. 1}$$

where, per epoch t, $u_s(t)$ is a form of self-adaptation to enable each source 15 to reconfigure itself during use.

Figure 3:
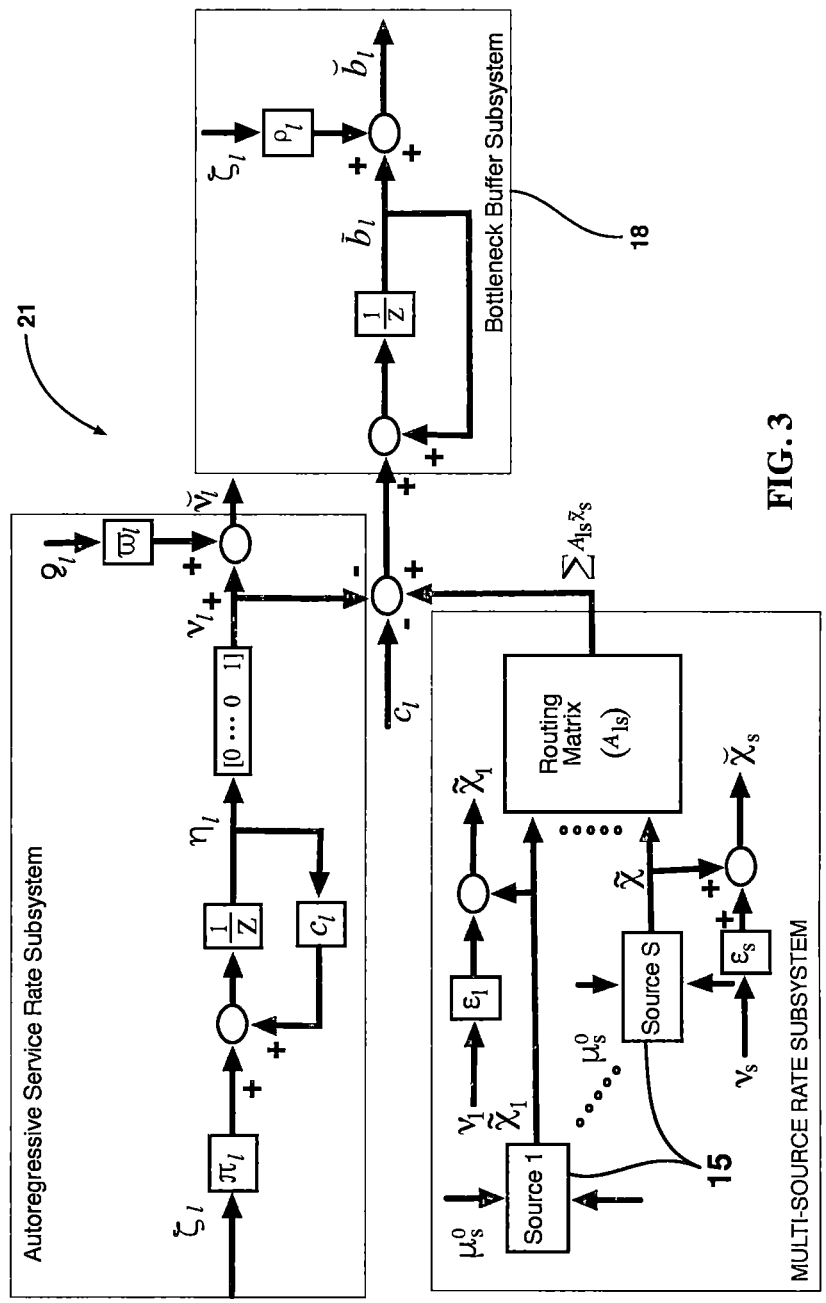
FIG. 3 is a block diagram of exemplary interconnected heterogeneous networks having a single bottleneck subsystem.

Referring to FIG. 3, the buffer 18 size at the bottleneck 13 is given by:

$$b_l(t+1) = [b_l(t) + y_l(t) - c_l - \mu_l(t)]^+ \qquad \text{Eq. 2}$$

where $[z]^+ = \max\{z, 0\}$, $b_l(t)$ is the buffer 18 size at the bottleneck 13 link l in period t and $c_l$ is the true link capacity available to serve all the input rates from the sources 15 s.

A setpoint is determined for each router 17 to provide the desired bandwidth allocation for the aggregate service rate. Changes in the actual setpoint $\mu_l(t)$ fluctuate around the desired setpoint $\mu^0$ due to the traffic effect of all uncorrelated demand rates, $x_s(t)$. The choice of the setpoint, $\mu^0$ preferably considers a mean packet delay, packet loss and bandwidth loss while maintaining sending rates according to service level agreements.

Thus, the desired setpoint is given by:

$$\mu_l^0 = \Sigma_{s \in S; l \in L} A_{ls} \mu^0 \quad \text{Eq. 3}$$

where vl(t) is the service rate is given by:

$$v_l(t) = \Sigma_{d=1}^{D} \theta_d v_l(t-d) + \pi_{l\zeta_l}(t) \quad \text{Eq. 4}$$

and the non-zero autoregressive parameters, $\theta_d$ in (4) correspond to time lags d and d=1, ..., D for the aggregate service rates, $v_l(t)$ at the bottleneck 13 link l, $\pi_l$ is a scaling parameter accounting for stochastic effects, and the change in actual setpoint is given by:

a. $\mu_l(t) = \mu^0 + v_l(t).$ \quad Eq. 5

Whereas, the actual buffer 18 setpoint $b^0_l$ is given by:

$$b^-(t+1) = [b^-l(t) + \Sigma_{s \in S, l \in L} A_{ls} \tilde{x}_s(t) - v_l(t) - c_l]^+ \quad \text{Eq. 6}$$

where $v_l(t) = \Sigma_{d=1}^{D} \theta_d v_l(t-d) + \pi_{l\zeta_l}(t)$, and for each epoch t $\tilde{b}_l(t) = b_l(t) - b^0_l$ and $\tilde{x}_s(t) = x_s(t) - \mu^0_s$; s∈S and the buffer 18 size solution is centered on setpoint $b^0_l$ and oscillates around a desired buffer 18 size of $b^0$. The buffer 18 size should not be too large, otherwise the packet will be too large to prevent packet losses and not be too small, otherwise potential throughput may be squandered.

Changes in buffer 18 service rate and buffer 18 sizes at epoch t and epoch t+1 are uncorrelated. A white noise assumption, also known as a Gaussian assumption, may be used to model first order dynamics of the noise distributions in the system. And the Gaussian assumption is used to model the inevitable white Gaussian random disturbance $\zeta(t)$ at epoch t leading to an autoregressive estimation with the dynamical state and output variables ηl(t) and vl(t) respectively given by:
1. 0
   •
   •
   •

$$\eta_l(t+1) = C_{l\eta l}(t) + [\ ]\zeta(t) \quad \text{Eq. 7}$$

i.0
ii. $\pi_l{}_{D \times 1}$ b. $v_l(t) = [0 \ldots 0 \ 1]_{1 \times D} \eta_l(t) \quad \text{Eq. 8}$ The Gaussian assumption may be further used to model first order dynamics of the noise distributions in the system.

Referring to FIG. 3 allocating router 17 preferably accounts for bottleneck 13 link capacity, bottleneck 13 service rates, the service loss penalty for deviating from a desired buffer 18 size and the penalty for high jitter/variability of source 15 sending rates. The bottleneck 13 link l adapts in response to the need for aggregational service rates. The bottleneck 13 link l may assess the load $\tilde{x}_s(t)$ for s∈S, regulated buffer 18 size $b^-_l(t)$ and time-lag service rates $v_l(t)$ respectively according to:

a. $x^\sim_s(t) = x_s(t) + \epsilon_l u s(t) \ s \in S$ \quad Eq. 9 b. $b^\sim_l(t) = \bar{b}_l(t) + \rho_l \zeta_l(t)$, and \quad Eq. 10 c. $v^\sim_l(t) = v_l(t) + \omega \vartheta_l(t).$ \quad Eq. 11 where $u_s(t)$, s∈S, $\zeta_l(t)$ and $\vartheta_l(t)$ each represent zero mean stochastic Gaussian white noises.

Figure 4:
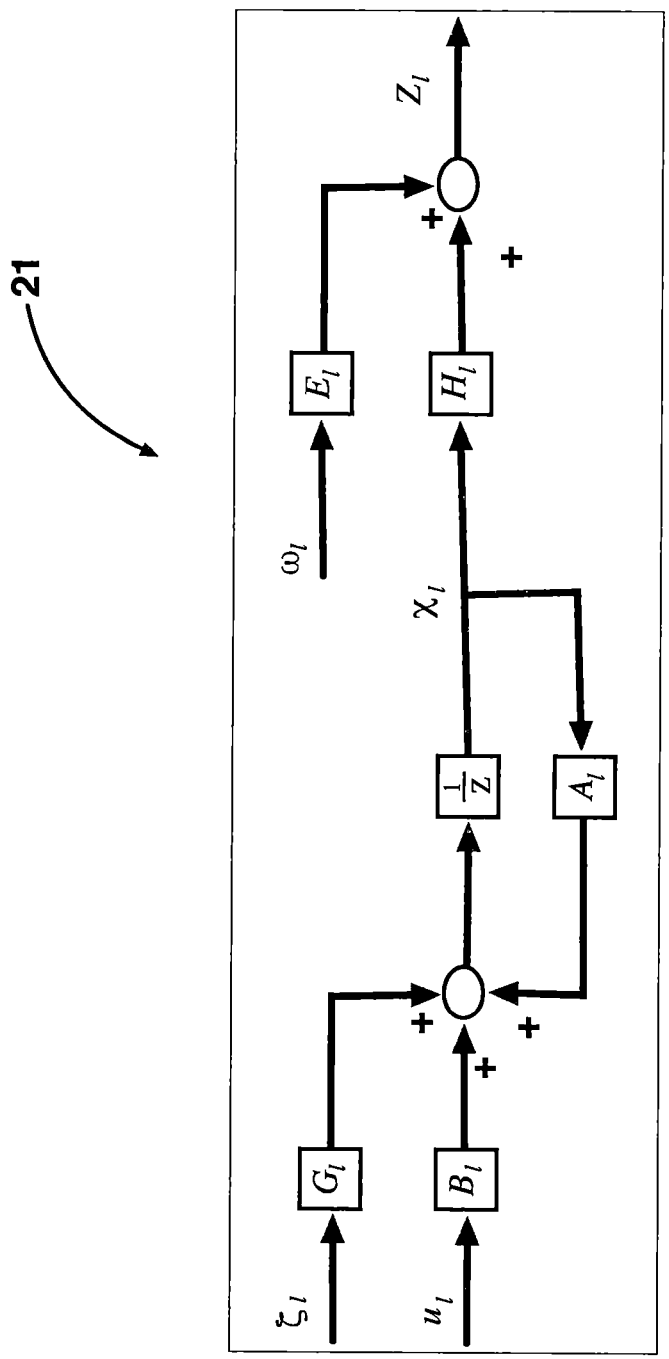
FIG. 4 is a block diagram of a multisource network having an exemplary feedback control loop.

Referring to FIG. 4, the present invention uses a demand/supply architecture to monitor a series of feedback signals generated by the bottleneck 13 link l and sent to respective routes. The feedback signals are interpreted as having a zero-mean Gaussian white noise $\zeta_l(t)$ with an associated variance $E\{\zeta^2_l(t)\} = \sigma_l^2$ representing stochastic effects at the bottleneck 13 link l at time t. A feedback system may be used to management the tradeoff of risk versus guaranteed performance. The load at the upcoming epoch can be given by:

$$x_l(t+1) = A_l x_l(t) + B_l u_l(t) + G_{l\zeta_l}(t) \quad \text{Eq. 12}$$

wherein $A_l$ is the state matrix, $B_l$ is the control matrix and $G_l$ is the observation matrix. One of skill will recognize the Markovian dynamics depend upon current state $x_l(t)$, the decision tree $u_l(t)$ and an independently identically distributed zero mean random variable $\zeta_l(t)$.

Once the load is known, the bottleneck 13 link l may select one or more rate correcting actions $U_l$ from a predetermined set of admissible values. The predetermined admissible values preferably consider performance parameters such as actual source 15 rates, bottle-neck link capacity, bottleneck 13 service rates; deviations from a desired buffer 18 size; and a penalty for high jitter/variability of source 15 sending rates.

Thus a multi-objective performance measure of these performance parameters can be given by:

a. $J_l(n_0) = \Sigma_{n=n_0+1}^{N} \{w_1 \|\Sigma_{s \in S; l \in L} A_{ls} x^-_s(n) - c_l - v_l(n)\|^2 + w_2 \|\bar{b}_l(n)\|^2 + w_3 \|u_l(n)\|^2 \}$ \quad Eq. 13 wherein $J_l(n_a)$ is the probability density function and may be a chi-squared random variable, N=the number of time slots within an epoch and the weights $w_1, w_2, w_3 \in R^+$ are initially each set at unity and adjusted based upon real time feedback as helpful to optimize real-time iterative feedback of tracking penalty, buffer 18 size deviation penalty and jitter/variability penalty, to approximate the desired setpoints. For example, if voice communications lag due to signal delays, videos freeze due to buffer 18 overflow and/or excessive noise occurs, the three weights can be adjusted up or down based upon real time empirical feedback.

Figure 5A:
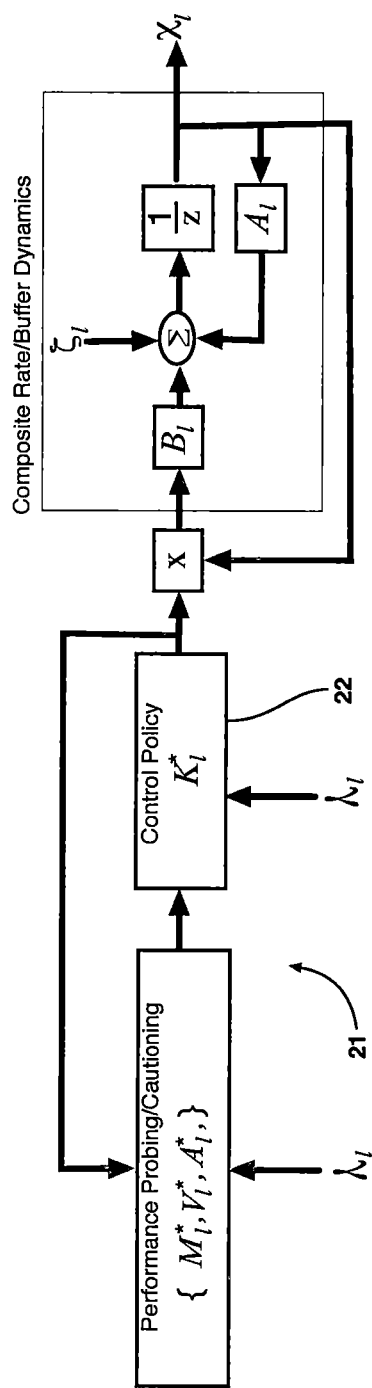
FIG. 5A is a block diagram of a network according to the present invention having an exemplary Minimal-Cost-Variance control paradigm.
Figure 5B:
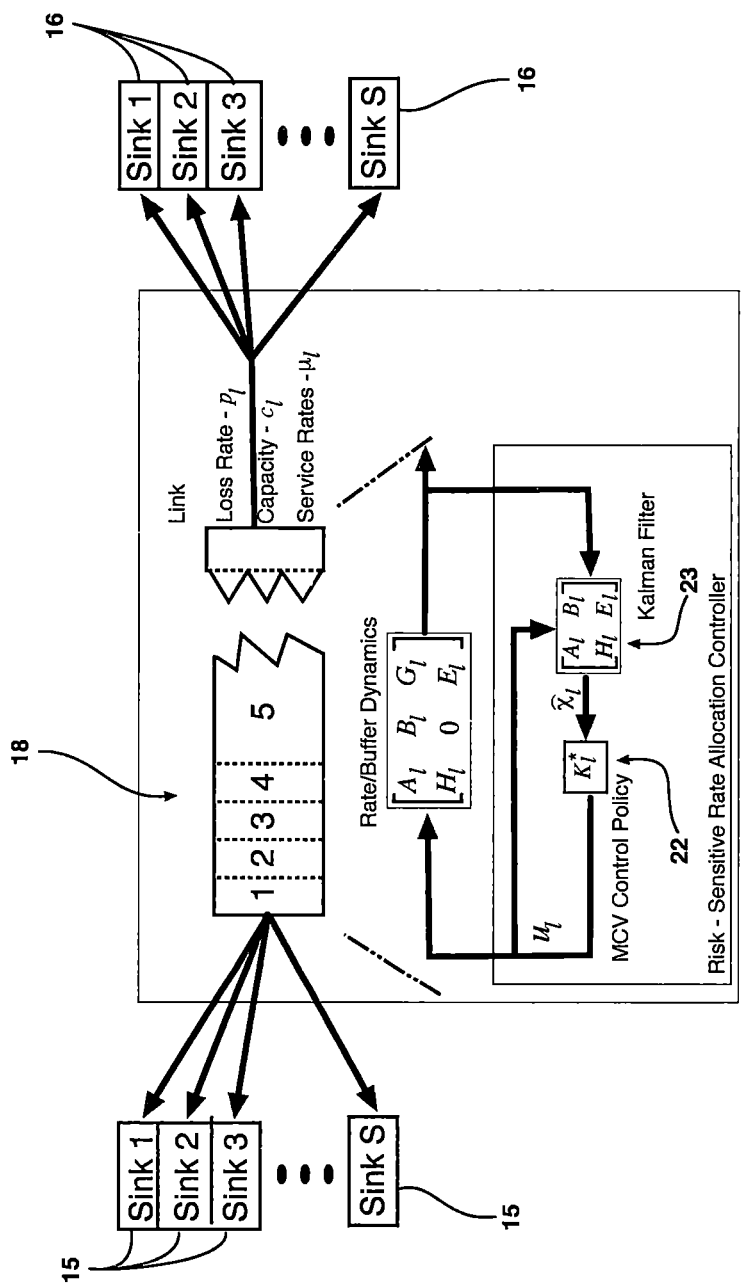
FIG. 5B is a multisource heterogeneous network according to the present invention illustrating a bottleneck link having an exemplary Kalman Filter.

Referring to FIGS. 5A and 5B [7 and 9] the unpredictable dynamics of a heterogeneous network 10 can be characterized by a Minimal Cost Variance (MCV) control paradigm 22. Thus one of skill may prefer to minimize the variance of the performance measure according to a. $E\{J^2_l | Z_l(n0)\} - E^2\{J_l(n_0) | Z_l(n_0)\}$ \quad Eq. 14 where $E\{\bullet|\bullet\}$ is the conditional expectation operator taken over the random state $x_l(n_0)$.

Figure 6:
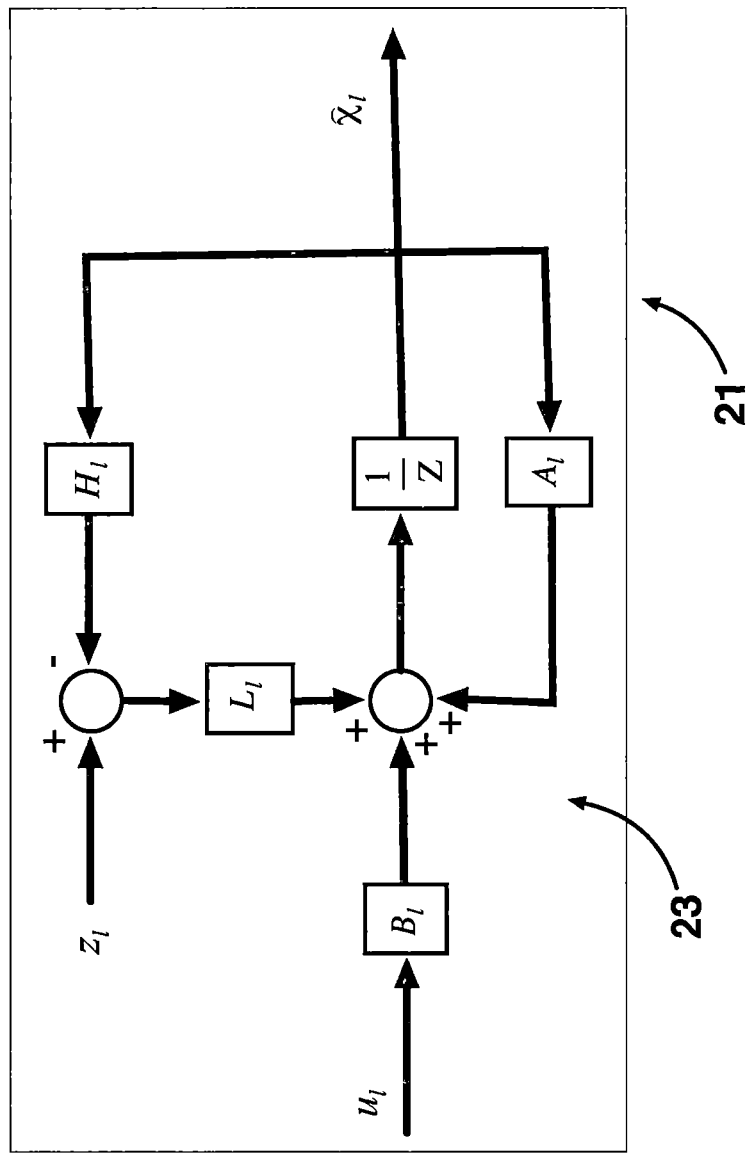
FIG. 6 is a block diagram of a state space realization of a Kalman filter usable with the network of the present invention.

Referring to FIG. 6, a Kalman filter 23 may be used to predict system availability and noise variance. Particularly, the Kalman filter 23 may be used may be used to predict the single-stage estimate according to a. $x^\sim_l(n|n-1) = A_l x^\sim_l(n-1|n-1) + B_l u_l(n-1).$ \quad Eq. 15

Referring back to FIG. 1 if desired, one of skill may adjust the window 24 size to accommodate the differential bandwidths which occur in heterogeneous networks 10. One of skill may select the known Reno scheme to provide adaptive window 24 allocation. Specifically the update of a window 24 size occurs according to probabilities. If the probability of an upstream packet being sent is $1 - q_s(t)$ the window 24 size is increased by one. If the source 15 detects packet loss with a probability of $q_s(t)$, the window 24 size is decreased by 50 percent, wherein $q_s(t)$ represents the end-to-end probability and is given by:

a. $q_s(t) = \Sigma_{s \in S; l \in L} A_{ls} p_l(t)$ \quad Eq. 16 provided the loss rate pl(t) at epoch t pertaining to the bottleneck 13 link l in the path of s is appropriately updated for instantaneous conditions.

The present invention advantageously provides for overcoming the problems of bottleneck 13 links/subject to rate allocating routers 17 and switches while considering aggregate input rate, aggregate service rate time lags and buffer 18 size stabilization using the above space state realization.

In another embodiment the invention comprises a non-transitory computer readable medium 30 suitable for and configured to carry out the computations and determinations of any of the foregoing, including only as limited by the claims below, algorithms, calculations, estimates such as but not limited to Kalman estimates, iterative/recursive exercises, solving of equations/inequalities and determinations of any of the parameters listed in the claims below.

Exemplary non-transitory computer readable media 30 are physical, transferable, reproducible, may comprise all computer readable media 30 except for a transitory propagating signal and particularly include flash drives, CD's, DVDs, internal/external hard drives, more particularly internal/external solid state hard drives, and further exclude RAM, volatile memory requiring power for data storage, signals and effervescent carrier waves. In an alternative embodiment, transitory computer readable media 30 may also be used.

To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a signal processor or a block of random access memory, hard disk, or the like) or multiple pieces of hardware. Similarly, the programs may be standalone programs, may be incorporated as subroutines in an operating system, may be functions in an installed software package, and the like. It should be understood that the various embodiments are not limited to the arrangements and instrumentality shown in the drawings.

What is claimed is:

1. A dynamic heterogeneous network for transmitting media, said system comprising:
   at least one source for transmitting a media signal;
   at least one destination for receiving a media signal;
   a link intermediate said at least one source and said at least one destination, and being in direct communication with said at least one source and said at least one destination, whereby a media signal is transmitted through said link towards said destination, and
   a non-transitory computer readable medium operably associated with said link and configured to autonomously allocate a respective buffer size to each of said media signals to be transmitted to said source according to a closed loop allocation algorithm having predetermined rate allocation performance specifications and which
   a) first determines an actual demand rate for each media signal, a logical queue and a buffer size,
   b) then determines a difference between said actual demand rate and an actual service rate, a buffer size and an associated buffer setpoint,
   c) reconfigures a rate allocation allowance for at least one said media signal and
   d) uses a stochastic control paradigm to reduce performance variations in said rate allocation allowance wherein said stochastic control paradigm is a Minimal-Cost-Variance control paradigm.

2. A network according to claim 1 wherein said algorithm is further configured to responsively transition to an adaptive window allocation scheme for controlling a plurality of outstanding data packets.

3. A network according to claim 2 wherein said window allocation scheme is a Reno scheme.

4. A dynamic heterogeneous network for transmitting media over satellite networks and terrestrial networks, said system comprising:
   at least one source for transmitting a media signal;
   at least one destination for receiving a media signal;
   a link intermediate said at least one source and said at least one destination, and being in direct communication with said at least one source and said at least one destination, whereby a media signal transmitted from said source is transmitted through said link towards said destination, and
   a non-transitory computer readable medium operably associated with said link and configured to autonomously allocate a respective buffer size to each of said media signals to be transmitted to said source according to a closed loop allocation algorithm having predetermined rate allocation performance specifications and which
   a) first determines an actual demand rate for each media signal, a logical queue and a buffer size,
   b) then determines a difference between said actual demand rate and an actual service rate, a buffer size and an associated buffer setpoint,
   c) determines a signal bottleneck for an epoch based upon at least one penalty for a high jitter or a high variability of a source rate from a plurality of predetermined sources,
   d) reconfigures a rate allocation allowance adapted to reduce said bottleneck for at least one said media signal,
   e) uses a stochastic control paradigm to reduce performance variations in said rate allocation allowance and
   f) transitions to an adaptive Reno window allocation scheme for controlling a plurality of outstanding data packets.

5. A network according to claim 4 wherein said change in source rate is determined by:

$$\tilde{x}_s(t+1) = \tilde{x}_s(t) + b_s u_s(t); \ s \in S.$$

6. A network according to claim 4 wherein said buffer size is determined according to:

$$b_l(t+1) = [b_l(t) + y_l(t) - c_l - \mu_l(t)]^+$$

where $[z]^+ = \max\{z, 0\}$, $c_l$ is a true signal capacity for said plurality of sources at said bottleneck at a time t.

7. A network according to claim 6 wherein said buffer size incorporates a buffer size setpoint VI, said setpoint VI being determined accord to:

$$\tilde{b}_l(t+1) = [\tilde{b}_l(t) + \Sigma A_{ls} \tilde{x}_s(t) - v_l(t) - c$$

$$s \in S; \ l \in L$$

where $v_l(t) = \Sigma^d_{d=1} \theta_d v_l(t-d) + \pi_l \zeta_l(t)$,
provided that for each epoch $\tilde{b}_l(t) = b_l(t) - b^0$ and $\tilde{x}_s(t) = x_s(t) - \mu^0$; $s \in S$.

8. A network according to claim 7 wherein said signal bottleneck has an aggregate input rate at time t determined according to:

$$y_l(t) = \Sigma A_{ls} x_s(t).$$

$$s \in S; \ l \in L$$

9. A network according to claim 8 wherein said signal has a signal setpoint determined as:

$$\mu_l^0 = \Sigma A_{ls}\mu_s^0.$$

$$s \in S; \; l \in L$$

10. A network according to claim 9 wherein a change in said source rate $x_s(t)$ for an epoch is given by:

$$x^-_s(t+1) = x^-(t) + b_s u_{s(t)}(t); \; s \in S.$$

11. A network according to claim 10 wherein a desired variance to said actual service rate is given by:

$$V_l^*(n) = A_{l^*}T(n)[4S_l(n)\sigma_l^2 G_l G_l^T S_l(n) + V_{l^*}(n+1)]A_{l^*}(n)$$

where $A_{l^*}(n) \triangleq A_l + A_l + B_l K_l^*(n)$ and $n_0 \leq n \leq N-1$.

12. A network according to claim 11 wherein a correction to said actual service rate is determined according to a Minimal Cost Variance paradigm.

13. A network according to claim 12 wherein a prediction of an actual service rate is determined according to a Kalman filter.

14. A network according to claim 13 wherein said prediction is determined according to:

$$\hat{x}_l(n|n-1) = A_{l_x}\hat{x}_l(n-1|n-1) + B_{l_u l}(n-1).$$

15. A network according to claim 14 wherein a window of said buffer size is determined according to said Reno window allocation scheme.

16. A method of transmitting media using a dynamic heterogeneous network, said method comprising the steps of:

providing at least one source for transmitting a media signal;

providing at least one desination for receiving a media signal;

providing a link intermediate said at least one source and said at least one destination, and being in direct communication with said at least one source and said at least one destination, whereby a media signal transmitted from said source is transmitted through said link towards said destination;

determining an actual demand rate for each media signal, a logical queue and a buffer size;

determining a difference between said actual demand rate and an actual service rate, a buffer size and an associated buffer setpoint;

determining a rate allocation allowance for at least one said media signal; and using a stochastic control paradigm to reduce performance variations in said rate allocation allowance to autonomously allocate a said respective buffer size to each of said media signals to be transmitted to said source according to a closed loop allocation algorithm; and using a Minimal Cost Variance paradigm predetermined rate allocation performance specification to minimize a variation around said buffer setpoint.

17. A method according to claim 16 further comprising the step of using a Kalman filter to predict said variance.

* * * * *